United States Patent
Lee

(10) Patent No.: US 12,430,884 B2
(45) Date of Patent: Sep. 30, 2025

(54) DEVICE AND METHOD FOR DETECTING OBJECT

(71) Applicants: HYUNDAI MOTOR COMPANY, Seoul (KR); Kia Corporation, Seoul (KR)

(72) Inventor: Jae Hong Lee, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 429 days.

(21) Appl. No.: 17/950,328

(22) Filed: Sep. 22, 2022

(65) Prior Publication Data
US 2023/0334825 A1    Oct. 19, 2023

(30) Foreign Application Priority Data

Apr. 13, 2022  (KR) ........................ 10-2022-0045850

(51) Int. Cl.
| | |
|---|---|
| G06V 10/764 | (2022.01) |
| G06V 10/26 | (2022.01) |
| G06V 10/56 | (2022.01) |
| G06V 10/74 | (2022.01) |
| G06V 20/56 | (2022.01) |

(52) U.S. Cl.
CPC .......... *G06V 10/764* (2022.01); *G06V 10/267* (2022.01); *G06V 10/56* (2022.01); *G06V 10/761* (2022.01); *G06V 20/56* (2022.01)

(58) Field of Classification Search
CPC ...... G06V 10/764; G06V 10/26; G06V 10/56; G06V 10/761; G06V 10/267; G06V 20/56; G06V 10/25; G06V 10/82; G06V 20/584; G06V 20/588; G06V 40/10; G06V 20/58; G06V 20/54; G06F 18/241; G06F 18/24;

(Continued)

(56) References Cited

U.S. PATENT DOCUMENTS

| | | |
|---|---|---|
| 2019/0065908 A1 | 2/2019 | Lee et al. |
| 2019/0310636 A1* | 10/2019 | Halder ................. G05D 1/0088 |
| 2023/0169777 A1* | 6/2023 | Song et al. ............ G06V 20/58 |

FOREIGN PATENT DOCUMENTS

| | | |
|---|---|---|
| KR | 10-2188649 B1 | 12/2020 |
| KR | 10-2021-0124024 A | 10/2021 |

OTHER PUBLICATIONS

Definition of Gray Scale, Oct. 12, 2021, https://www.merriam-webster.com/dictionary/grayscale; Merriam-Webster Dictionary (Year: 2021).*

* cited by examiner

*Primary Examiner* — Matthew C Bella
*Assistant Examiner* — Daniel Joseph Santos
(74) *Attorney, Agent, or Firm* — MORGAN, LEWIS & BOCKIUS LLP

(57) ABSTRACT

A device and a method for detecting an object includes a camera configured for obtaining an image frame for an external environment of a vehicle, storage configured for storing a class classification model of the image frame, and a processor. The processor extracts a class for distinguishing the object in the image frame, determines class confidences for each of pixels of the image frame, generates a distribution of confidences for grayscales of pixels belonging to a class of interest based on the class confidences, generates a critical range for determining a grayscale of the class of interest based on the distribution of the confidences for the grayscales, and generates a mask based on the critical range.

18 Claims, 15 Drawing Sheets

(58) Field of Classification Search
CPC ......... G06F 18/214; G06T 7/11; G06T 7/254; G06T 7/248; G06T 7/0002
See application file for complete search history.

| 12 | 8 | 340 | ... | 2 | 70 |
|----|---|-----|-----|---|-----|
| $C_1$ | $C_2$ | $C_3$ | ... | $C_{k-1}$ | $C_k$ |

Fig.7

| 0.03 | 0.02 | 0.98 | ... | 0.005 | 0.07 |
| :---: | :---: | :---: | :---: | :---: | :---: |
| $d_1$ | $d_2$ | $d_3$ | ... | $d_{k-1}$ | $d_k$ |

Fig.8

DEVICE AND METHOD FOR DETECTING OBJECT

CROSS-REFERENCE TO RELATED APPLICATION

The present application claims priority to Korean Patent Application No. 10-2022-0045850, filed on Apr. 13, 2022, the entire contents of which is incorporated herein for all purposes by this reference.

BACKGROUND OF THE PRESENT DISCLOSURE

Field of the Present Disclosure

The present disclosure relates to a device and a method for detecting an object, and more particularly, to a technology for detecting an object from an external environment image of a vehicle.

Description of Related Art

A vehicle may be classified into an internal combustion engine vehicle, an external combustion engine vehicle, a gas turbine vehicle, an electric vehicle, or the like depending on a type of a motor used.

An autonomous vehicle refers to a vehicle which may operate by itself without manipulation of a driver or a passenger, and automated vehicle & highway systems refer to systems that monitor and control such autonomous vehicle to operate by itself.

In addition to the autonomous vehicle, technologies for monitoring an external environment of the vehicle for assisting driving of the driver and operating various driving assistance means based on the monitored vehicle external environment are being provided.

To monitor a region outside of the vehicle, a scheme for determining an object from a filmed external environment image is also used.

As the scheme for determining the object, artificial intelligence learning may be used, and a scheme for detecting a class of the object based on a preset threshold value may also be used. In the conventional scheme, because class classification utilizes the threshold value of a fixed magnitude, a phenomenon in which learning for object detection is not flexible may occur. This is because even the same object may frequently have a grayscale value different from that in previous learning data in an image frame depending on a lighting, a weather, and other surrounding conditions at a moment of filming.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device and a method for detecting an object configured for more accurately classifying classes of an object.

Another aspect of the present disclosure provides a device and a method for detecting an object configured for actively classifying classes of an object in response to a change in an external environment.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device configured for detecting an object includes a camera configured for obtaining an image frame for an external environment of a vehicle, a storage configured for storing a class classification model of the image frame, and a processor. The processor extracts a class for distinguishing the object in the image frame, determines class confidences for each of pixels of the image frame, generates a distribution of confidences for grayscales of pixels belonging to a class of interest based on the class confidences, generates a critical range for determining a grayscale of the class of interest based on the distribution of the confidences for the grayscales, and generates a mask based on the critical range.

In an exemplary embodiment of the present disclosure, the processor may be configured to extract the class for distinguishing the object in the image frame using a segmentation model.

In an exemplary embodiment of the present disclosure, the processor is configured to determine a similarity between an arbitrary pixel and each of preset classes, and determine a confidence of the arbitrary pixel with each of the preset classes based on the similarity.

In an exemplary embodiment of the present disclosure, the processor is configured to determine the confidence in proportion to a magnitude of the similarity.

In an exemplary embodiment of the present disclosure, the processor is configured to determine the confidence based on cumulatively learned similarity.

In an exemplary embodiment of the present disclosure, the processor may be configured to extract pixels of interest belonging to the class of interest, extract grayscale values of the pixels of interest in the image frame, and match the confidences respectively to the grayscale values of the pixels of interest to generate the distribution of the confidences for the grayscales.

In an exemplary embodiment of the present disclosure, the processor may, when the image frame includes n (n is a natural number) pixels expressing a single color, extract the pixels of interest from the n pixels.

In an exemplary embodiment of the present disclosure, the processor may, when the image frame includes R, G, and B pixels, obtain a distribution of confidences for grayscales for the R pixel of the class of interest, obtain a distribution of confidences for grayscales for the G pixel of the class of interest, and obtain a distribution of confidences for grayscales for the B pixel of the class of interest.

In an exemplary embodiment of the present disclosure, the processor may be configured to generate a normalized distribution based on the distribution of the confidences for the grayscales, determine a margin so that a preset sample ratio is included in the normalized distribution, and determine a range region from a value obtained by subtracting the margin from an average grayscale value of the normalized distribution to a value obtained by adding the margin to the average grayscale value as the critical range.

In an exemplary embodiment of the present disclosure, the processor may be configured to generate the mask to extract a grayscale value belonging to the critical range as the class of interest.

According to another aspect of the present disclosure, a method for detecting an object includes extracting a class for distinguishing the object in an image frame, determining class confidences for each of pixels of the image frame, generating a distribution of confidences for grayscales of pixels belonging to a class of interest based on the class confidences, generating a critical range for determining a grayscale of the class of interest based on the distribution of the confidences for the grayscales, and generating a mask based on the critical range.

In an exemplary embodiment of the present disclosure, the extracting of the class for distinguishing the object in the image frame may use a segmentation model.

In an exemplary embodiment of the present disclosure, the determining of the class confidences for each of the pixels of the image frame may include determining a similarity between an arbitrary pixel and each of preset classes, and determining a confidence of the arbitrary pixel with each of the preset classes based on the similarity.

In an exemplary embodiment of the present disclosure, the determining of the confidence of the arbitrary pixel with each of the classes may include determining the confidence in proportion to a magnitude of the similarity.

In an exemplary embodiment of the present disclosure, the determining of the confidence of the arbitrary pixel with each of the classes may include determining the confidence based on cumulatively learned similarity.

In an exemplary embodiment of the present disclosure, the generating of the distribution of the confidences for the grayscales of the pixels belonging to the class of interest may include extracting pixels of interest belonging to the class of interest, extracting grayscale values of the pixels of interest in the image frame, and matching the confidences respectively to the grayscale values of the pixels of interest to generate the distribution of the confidences for the grayscales.

In an exemplary embodiment of the present disclosure, the extracting of the pixels of interest may include, when the image frame includes n (n is a natural number) pixels expressing a single color, selecting the pixels of interest from the n pixels.

In an exemplary embodiment of the present disclosure, the extracting of the pixels of interest may include, when the image frame includes R, G, and B pixels, obtaining a distribution of confidences for grayscales for the R pixel of the class of interest, obtaining a distribution of confidences for grayscales for the G pixel of the class of interest, and obtaining a distribution of confidences for grayscales for the B pixel of the class of interest.

In an exemplary embodiment of the present disclosure, the generating of the critical range may include generating a normalized distribution based on the distribution of the confidences for the grayscales, determining a margin so that a preset sample ratio is included in the normalized distribution, and determining a range region from a value obtained by subtracting the margin from an average grayscale value of the normalized distribution to a value obtained by adding the margin to the average grayscale value as the critical range.

In an exemplary embodiment of the present disclosure, the generating of the mask may include generating the mask to extract a grayscale value belonging to the critical range as the class of interest.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 7 is a view exemplarily illustrating a result of determining class similarities for an n-th pixel;

FIG. 8 is a view exemplarily illustrating a result of determining class confidences for an n-th pixel;

Figure 1:
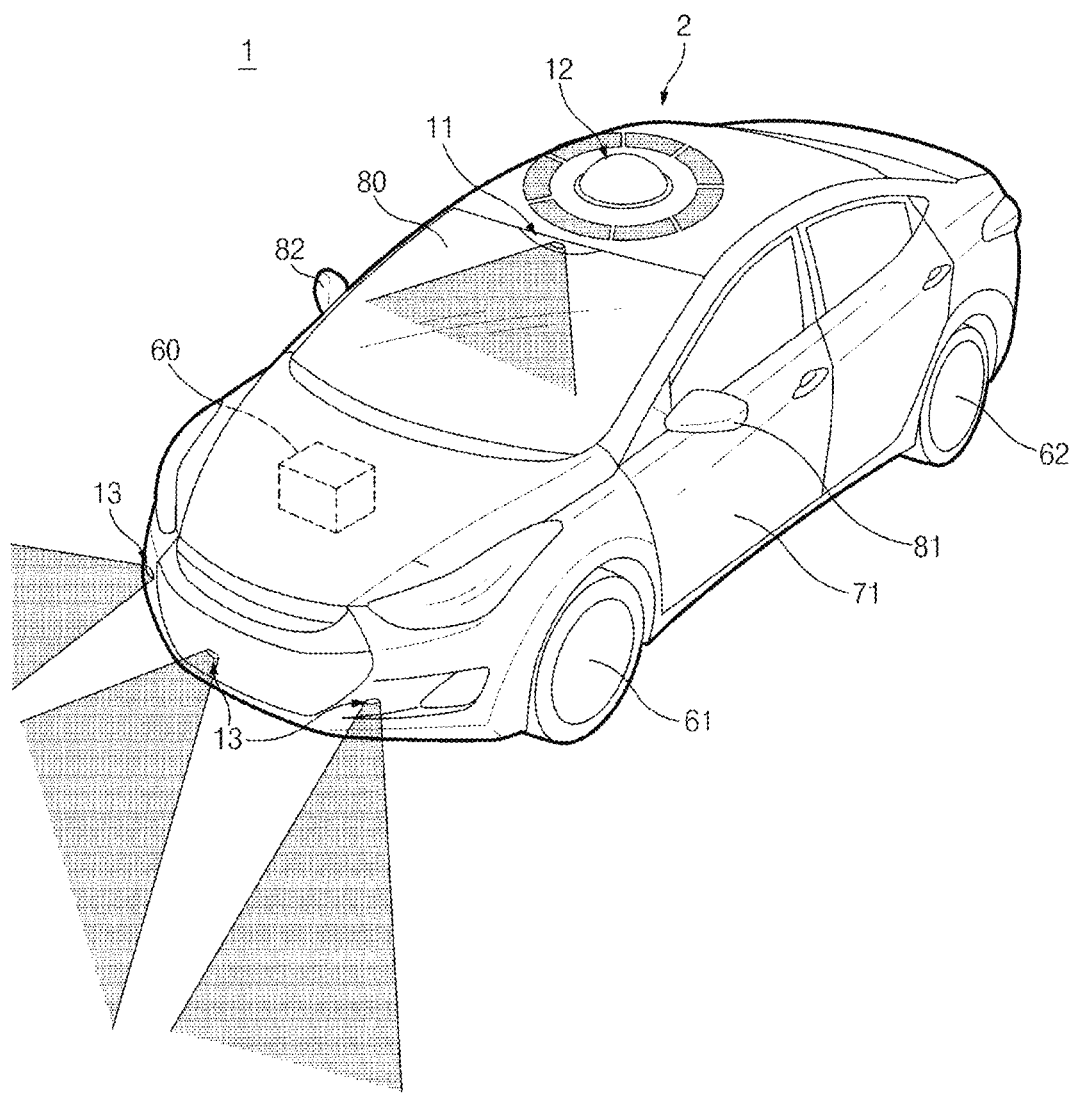
FIG. 1 is a view exemplarily illustrating a vehicle including an object tracking device in an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment according to an exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, various embodiments of the present disclosure will be described in detail with reference to FIGS. 1 to 15.

Figure 2:
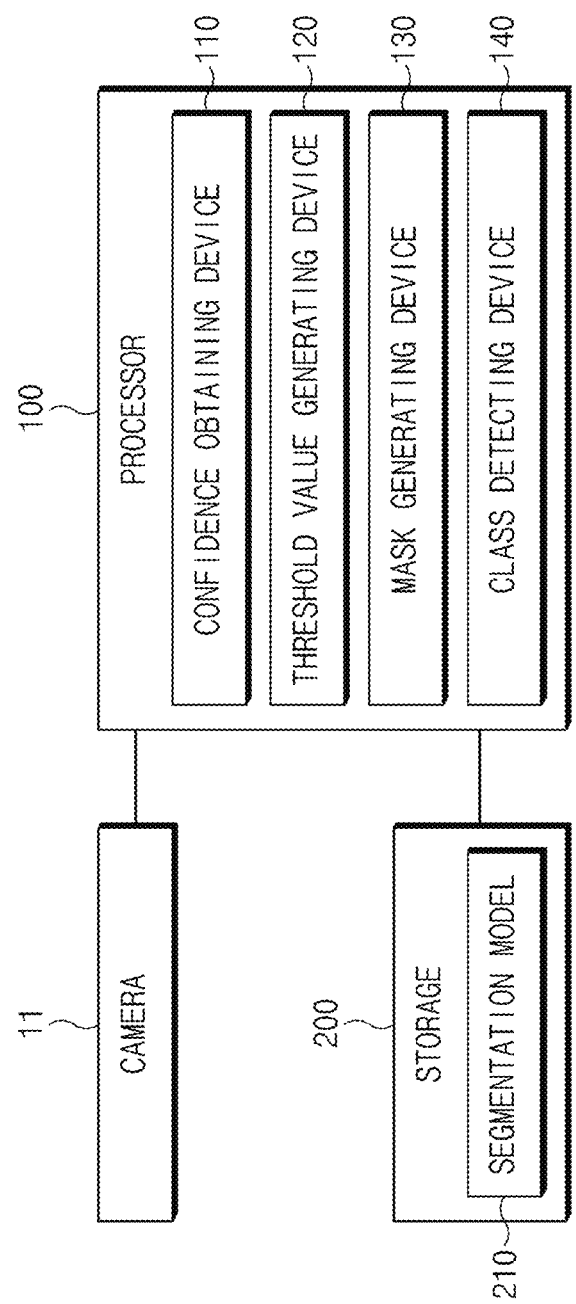
FIG. 2 is a block diagram illustrating a configuration of an object tracking device according to an exemplary embodiment of the present disclosure.

FIG. 1 is a view exemplarily illustrating a vehicle including an object tracking device in an exemplary embodiment of the present disclosure. FIG. 2 is a block diagram illustrating a configuration of an object tracking device according to an exemplary embodiment of the present disclosure.

Referring to FIG. 1 and FIG. 2, a vehicle 1 according to an exemplary embodiment of the present disclosure may include a main body 2 that forms an appearance of the vehicle 1, wheels 61 and 62 that move the vehicle 1, a driving device 60 that rotates the wheels 61 and 62, a door 71 that shields an interior of the vehicle 1 from an exterior of the vehicle 1, a windshield 80 that provides a front view of the vehicle 1 to a user inside the vehicle 1, and side mirrors 81 and 82 that provide side and rear views of the vehicle 1 to the user.

The wheels 61 and 62 may include the front wheel 61 provided at a front portion of the vehicle and the rear wheel 62 provided at a rear portion of the vehicle, and the driving device 60 may provide a rotation force to the front wheel 61 or the rear wheel 62 so that the main body 2 moves forward or rearward thereof.

The door 71 may be pivotably provided at each of left and right sides of the main body 2, so that an occupant may board the vehicle 1 when the door 71 is opened and the interior of the vehicle 1 may be shielded from the exterior of the vehicle 1 when the door 71 is closed.

The windshield 80, which is a kind of windscreen, may be provided at a front upper side of the main body 2 to provide information related to the front view of the vehicle 1 to a driver or the user inside the vehicle 1.

The side mirrors 81 and 82 may include the left side mirror 81 provided at the left side of the main body 2 and the right side mirror 82 provided at the right side of the main body 2, and may provide information related to the side and rear views of the vehicle 1 to the driver inside the vehicle 1.

The vehicle 1 may be an electrification-based vehicle, such as an electric vehicle (EV), a hybrid electric vehicle (HEV), a plug-in hybrid electric vehicle (PHEV), a fuel cell electric vehicle (FCEV), and the like. In a case of the electrification-based vehicle, the driving device 60 may be a driving motor.

An object detecting device may determine an object outside the vehicle based on data received from a sensor device.

The sensor device is configured for obtaining sensing data for extracting objects around the vehicle. The sensor device may include a camera 11, a Light Detection and Ranging (LiDAR) 12, a Radar 13, and the like. Positions where the camera 11, the LiDAR 12, and the Radar 13 are formed may not be limited to those in FIG. 1.

The camera 11 may obtain image data based on sensing of light in a visible region from a region in front of the vehicle.

The LiDAR 12 may determine the object by transmitting a laser pulse and measuring a time at which the transmitted laser pulse is reflected. The LiDAR 12 may provide three-dimensional information.

The Radar 13 may analyze the object by transmitting an electromagnetic wave and analyzing the returned electromagnetic wave. The Radar 13 may provide two-dimensional information and may provide information related to the object rapidly.

The object detecting device may include storage 200 in which a learning model for detecting the object based on the data obtained by the sensor device is stored, and a processor 100 that performs an object detection procedure based on the learning model stored in the storage 200. Hereinafter, an exemplary embodiment of the present disclosure will be described mainly based on the detecting of the object based on the image data obtained by the camera 11.

The storage 200 may be provided in the processor 100, and may be a separate memory. Therefore, the storage 200 may include a combination of a non-volatile memory such as a hard disk drive, a flash memory, an electrically erasable programmable read-only memory (EEPROM), a ferro-electric RAM (FRAM), a phase-change RAM (PRAM), a magnetic RAM (MRAM), and the like and/or a volatile memory such as a static RAM (SRAM), a dynamic random access memory (DRAM), a synchronous dynamic random access memory (SDRAM), a double date rate-SDRAM (DDR-SDRAM), and the like.

The learning model may be a segmentation model for extracting a class for distinguishing the object. The segmentation model may use fully convolutional networks (FCN).

The processor 100 may extract the class from an image frame, actively generate a critical range based on a grayscale value belonging to one class, and generate a mask in real time based on the critical range. Because the processor according to an exemplary embodiment of the present disclosure does not classify the class based on a fixed threshold value, even when a grayscale value of the object is changed by an external factor in an image obtained in real time, an occurrence of class classification errors may be reduced.

To the present end, the processor 100 may include a confidence obtaining device 110, a threshold value generating device 120, a mask generating device 130, and a class detecting device 140.

The confidence obtaining device 110 may extract the class from the image frame, and determine class confidences for each of pixels of the image frame. Furthermore, the confidence obtaining device 110 may generate a confidence distribution for grayscales of pixels belonging to a class of interest based on the class confidences.

The threshold value generating device 120 may generate the critical range for determining a grayscale of the class of interest based on the confidence distribution for the grayscales.

The mask generating device 130 may generate the mask for detecting the class of interest based on the critical range.

The class detecting device 140 may classify the class in the image frame based on the mask generated by the mask generating device 130.

Figure 3:
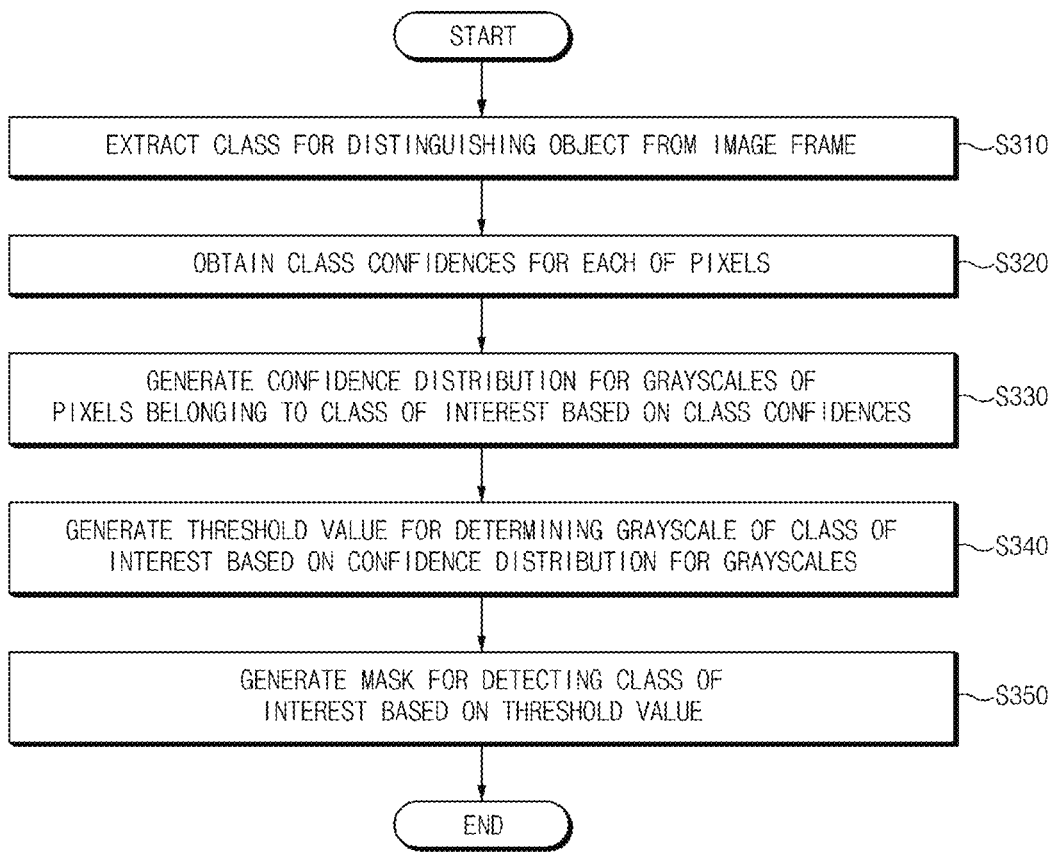
FIG. 3 is a flowchart illustrating an object detection method according to an exemplary embodiment of the present disclosure.

FIG. 3 is a flowchart illustrating an object detection method according to an exemplary embodiment of the present disclosure.

Referring to FIG. 3, the object detection method according to an exemplary embodiment of the present disclosure will be referred to as follows.

In S310, the processor 100 may extract the class for distinguishing the object from the image frame.

To the present end, the processor 100 may receive the image frame from the camera 11. The camera 11 may obtain image data forming the image frame and transmit the image data to the processor 100.

According to an exemplary embodiment of the present disclosure, one image frame may have a grayscale value expressing a single color.

According to another exemplary embodiment of the present disclosure, one image frame may have grayscale values of pixels expressing R, G, and B, three primary colors.

The confidence obtaining device 110 of the processor may be configured to extract the class for distinguishing the object using the segmentation model.

In S320, the confidence obtaining device 110 of the processor 100 may determine the class confidences for each of the pixels.

To the present end, the confidence obtaining device 110 of the processor 100 may determine similarities with a plurality of classes for each of the pixels. For example, when there are k (where k is a natural number) classes, the confidence obtaining device 110 may determine a similarity between an arbitrary pixel and each of the k classes.

The confidence obtaining device 110 of the processor 100 may determine a confidence between the arbitrary pixel and each of the preset classes based on the similarity. The processor 100 may determine the confidence in proportion to a magnitude of the similarity. Furthermore, the processor 100 may determine the confidence using the similarity which is cumulatively learned.

In S330, the confidence obtaining device 110 of the processor 100 may generate the confidence distribution for the grayscales of the pixels belonging to the class of interest based on the class confidences.

To the present end, the processor 100 may extract pixels of interest belonging to the class of interest.

The pixels of interest belong to the image frame, and the image frame may have grayscale values of all pixels. Accordingly, the processor 100 may extract grayscale values of the pixels of interest.

The processor 100 may generate the confidence distribution for the grayscales by matching the confidences with the grayscale values of the pixels of interest. That is, the processor 100 may generate the confidence distribution for the grayscales based on a confidence distribution for each pixel.

According to an exemplary embodiment of the present disclosure, one image frame may include n (n is a natural number) pixels expressing the single color, and the processor 100 may extract the pixels of interest among the n pixels.

According to another exemplary embodiment of the present disclosure, one image frame may include R, G, and B pixels, and the processor 100 may extract the pixels of interest for each of R, G, and B. As a result, the confidence obtaining device 110 of the processor 100 may obtain a confidence distribution for grayscales for the R pixel of the class of interest, obtain a confidence distribution for grayscales for the G pixel of the class of interest, and obtain a confidence distribution for grayscales for the B pixel of the class of interest.

According to another exemplary embodiment of the present disclosure, a method for obtaining the confidence distribution for the grayscales may use a hue, saturation, value (HSV) color space model. That is, the processor 100 may obtain a confidence distribution of a color, a confidence distribution of a saturation, and a confidence distribution of a brightness.

In S340, the mask generating device 130 of the processor 100 may generate the critical range for determining the grayscale of the class of interest based on the confidence distribution for the grayscales.

The mask generating device 130 may generate a normalized distribution based on the confidence distribution for the grayscales, and determine the critical range by applying a margin of an average value in the normalized distribution.

In S350, the mask generating device 130 of the processor 100 may generate the mask for detecting the class of interest based on the critical range.

Figure 4:
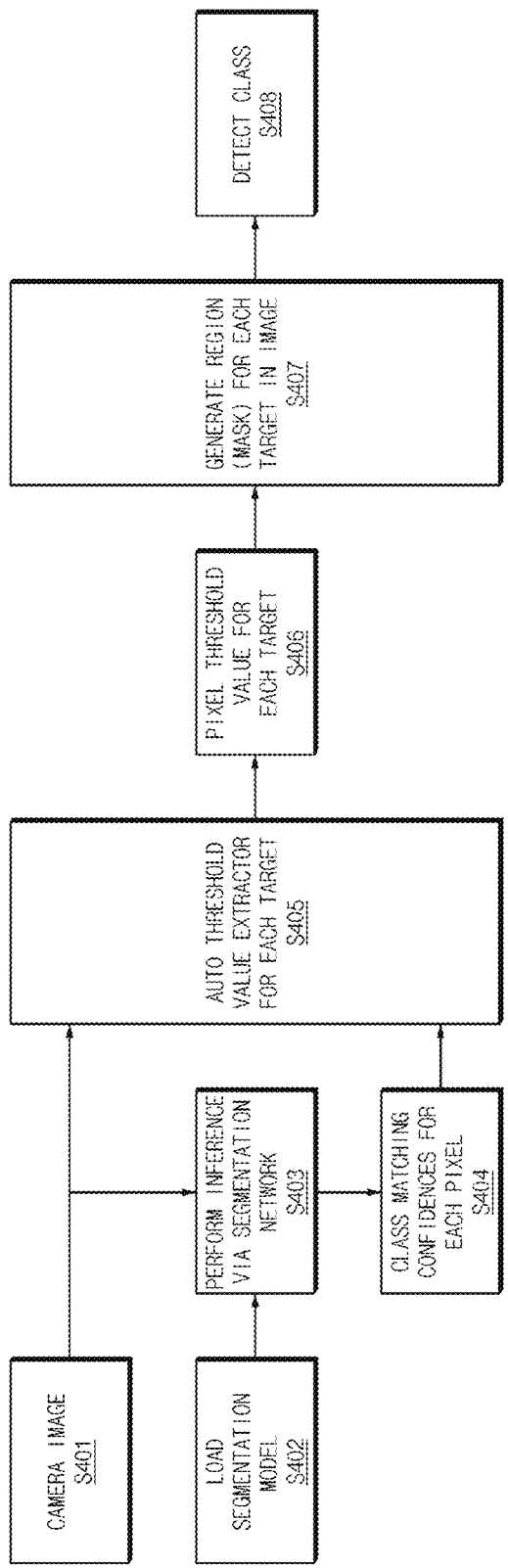
FIG. 4 is a flowchart illustrating an object detection method according to another exemplary embodiment of the present disclosure.

Hereinafter, a method for detecting an object according to another exemplary embodiment of the present disclosure will be described in detail with reference to FIG. 4. FIG. 4 is a flowchart illustrating an object detection method according to another exemplary embodiment of the present disclosure.

In S401, the processor 100 may receive the image data from the camera 11.

Figure 5:
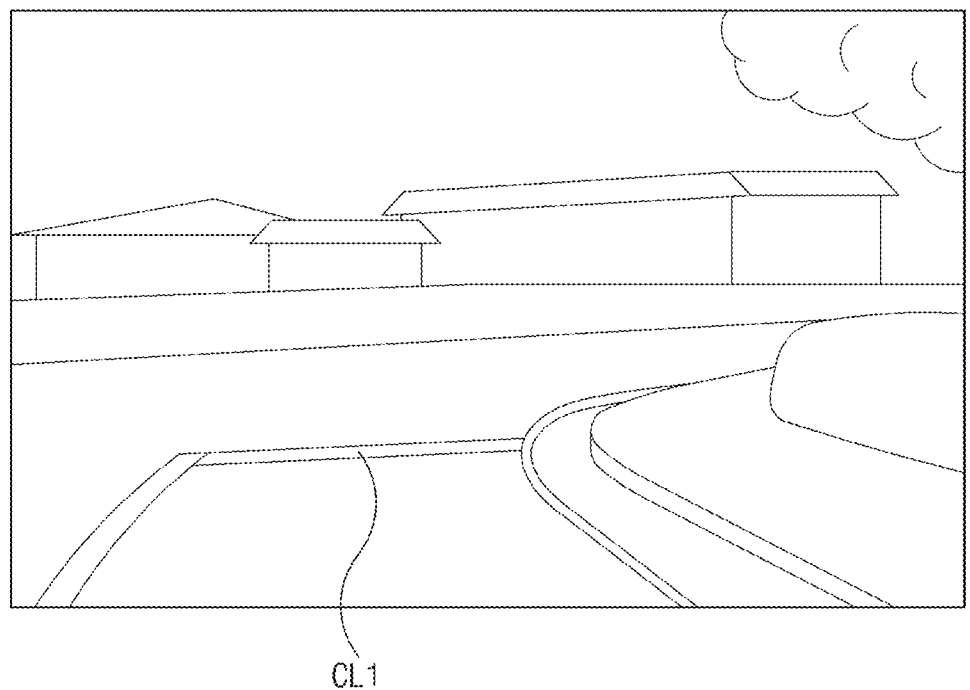
FIG. 5 is a view exemplarily illustrating an example of an external environment image obtained by a camera.

FIG. 5 is a view exemplarily illustrating an example of an external environment image obtained by a camera. The camera 11 may obtain the external environment image of the vehicle as shown in FIG. 5 based on a preset frame rate. FIG. 5 shows one image frame. The camera 11 may divide the external environment image in units of frames and transmit the image frames to the processor 100.

As a result, the processor 100 may divide the image data in units of the frames, and may perform an object detection procedure in the image frame.

In S402, the confidence obtaining device 110 of the processor 100 may load the segmentation model.

Figure 6:
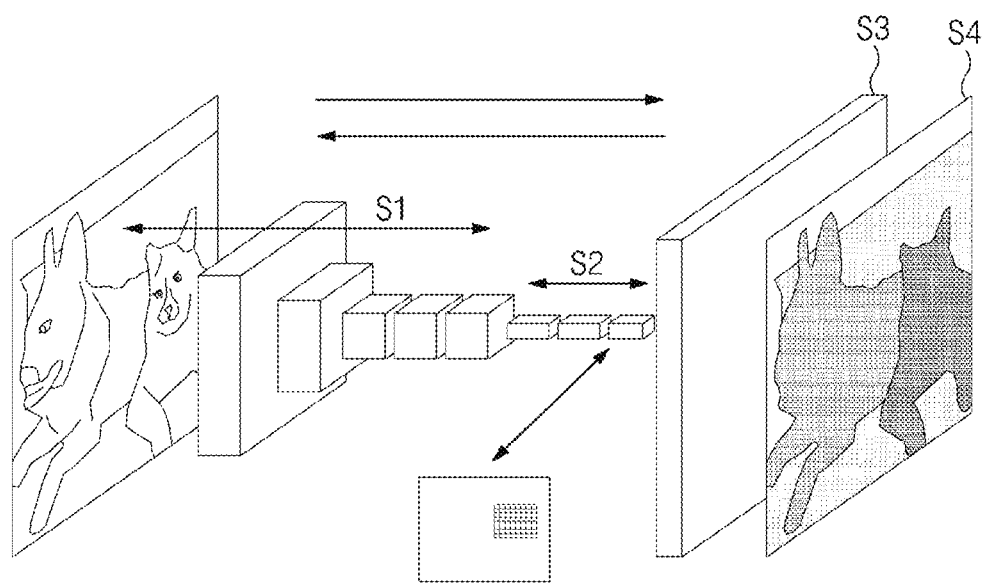
FIG. 6 is a view exemplarily illustrating an example of a segmentation model.

FIG. 6 is a view exemplarily illustrating an example of a segmentation model.

The processor 100 may perform image learning using an FCN model as in FIG. 6.

The FCN, which is a modified Convolutional Neural Networks (CNN)-based model that showed excellent performance in image classification, may be for a semantic segmentation task.

The image classification may have a structure of extracting features from all of the pixels in the image and inputting the extracted features to a classifier to predict the class of the input image (Total). A typical image classification model may include a fully connected layer (FCL) in the last layer of a network. Because the input requires a fixed magnitude to use the FCL, location information may disappear when passing through the FCL. Accordingly, the FCL may not be suitable for segmentation that essentially requires the location information.

The FCN may have a structure in which the last FCLs are replaced by a convolution layer.

The structure of the FCN may perform following functions.

In S1, the features may be extracted via the convolution layer.

In S2, the number of channels of a feature map may be changed to be the same as the number of data set objects using a 1×1 convolution layer.

In S3, after up-sampling a low-resolution heat map via up-sampling, a map having the same size as the input image may be generated.

In S4, network learning may be performed using a difference between a final feature map and a label feature map.

In S403, the confidence obtaining device 110 of the processor 100 may infer the object of the image frame based on the segmentation model.

The processor 100 may infer the object by learning the image data received from the camera 11 based on the segmentation model. The object inference performed in S403 may include the process of determining the class similarities of each pixel.

When the number of pixels belonging to the image frame is n (n is the natural number), the confidence obtaining device 110 may determine similarities with all of the classes of each of first to n-th pixels.

Figure 7:
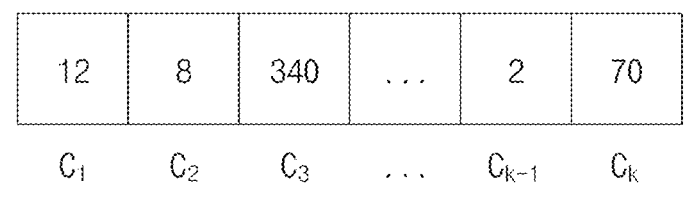

FIG. 7 is a view exemplarily illustrating a result of determining class similarities for an n-th pixel. FIG. 7 is a result of an exemplary embodiment including k (k is the natural number) classes.

Referring to FIG. 7, the arbitrary n-th pixel may include information of a similarity with each of the first to k-th classes. C1 may indicate a similarity between the n-th pixel and a first class, and C2 may indicate a similarity between the n-th pixel and a second class. Similarly, Ck may indicate a similarity between the n-th pixel and a k-th class. That is, FIG. 7 illustrates an example in which the n-th pixel Pn has the similarity of 12 with the first class and a similarity of 340 with a third class. As shown in FIG. 7, it may be estimated that the n-th pixel belongs to the third class C3 with the highest class similarity.

Although similarity classification using the conventional segmentation model extracted only a similarity with the greatest value, an exemplary embodiment of the present disclosure may extract the similarities with all of the classes and proceed with subsequent procedures based on the extracted similarities.

In S404, the confidence obtaining device 110 of the processor 100 may obtain the confidences for each pixel.

Figure 8:
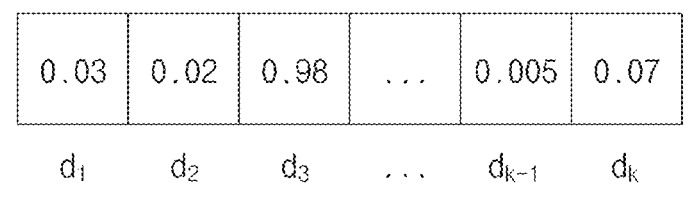

FIG. 8 is a view exemplarily illustrating a result of determining class confidences for an n-th pixel. FIG. 8 is a result of an exemplary embodiment including k (k is the natural number) classes.

Referring to FIG. 8, the arbitrary n-th pixel may include information of a confidence with each of the first to k-th classes. d1 may indicate a confidence between the n-th pixel and the first class, and d2 may indicate a confidence between the n-th pixel and the second class. Similarly, dk may indicate a confidence between the n-th pixel and the k-th class. That is, FIG. 8 illustrates an example in which the n-th pixel Pn has the confidence of 0.03 with the first class and a confidence of 0.98 with the third class.

The confidence obtaining device 110 may obtain the confidences with the classes based on the similarities. According to an exemplary embodiment of the present disclosure, the confidence obtaining device 110 may determine the confidence in proportion to the similarity within a range from 0 (inclusive) and 1 (inclusive). That is, the confidence obtaining device 110 may determine a probability distribution for which class a specific pixel belongs to. The confidence obtaining device 110 according to various exemplary embodiments of the present disclosure may use a softmax layer.

As a result, the confidence obtaining device 110 may infer which class each of the n pixels belongs to. [Table 1] below is a table showing a result of inferring, by the confidence obtaining device 110, the class for each pixel.

TABLE 1

| Pixel | Class | Confidence |
|---|---|---|
| P1 | C1 | d1~dn |
| P2 | C1 | d1~dn |
| ... | ... | d1~dn |
| Pn | C3 | d1(0.03), d2(0.02), d3(0.98) ... dn(0.07) |

As shown in [Table 1], the confidence obtaining device 110 may infer which class each pixel belongs to.

In S405, the threshold value generating device 120 of the processor 100 may obtain confidences for the grayscales for the class of interest.

Figure 9:
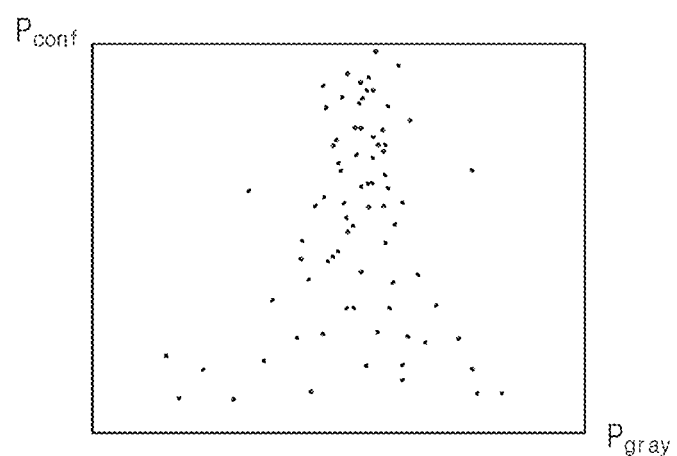
FIG. 9 is a view exemplarily illustrating a distribution of confidences corresponding to grayscale values of pixels belonging to a class of interest.

FIG. 9 is a view exemplarily illustrating a distribution of confidences corresponding to grayscale values of pixels belonging to a class of interest.

Referring to FIG. 9, the confidence distribution may be expressed as confidence Pconf corresponding to a grayscale value Pgray. The grayscale value expressed in the confidence distribution may mean the grayscale value of the pixels belonging to the class of interest. The class of interest may be one of the k classes, and may be a class which is a target of the inference performed using an exemplary embodiment of the present disclosure. The confidence for the grayscales may mean the confidence distribution of each pixel belonging to an arbitrary class.

To generate the confidence distribution for the grayscales of the pixels belonging to the class of interest, the threshold value generating device 120 may extract the pixels belonging to the class of interest. Furthermore, the threshold value generating device 120 may extract the grayscale values of the pixels belonging to the class of interest based on the image data of the image frame.

As shown in [Table 1], the number of samples the confidence for each pixel may have may be the number of classes. Therefore, the number of confidences in the confidence distribution of the grayscale values belonging to the class of interest may correspond to (the number of pixels belonging to the class of interest)×(the number of classes). For example, when the number of pixels belonging to the class of interest is 100 from a (n−99)-th pixel to the n-th pixel, the number of confidences in the confidence distribution of the grayscale values belonging to the class of interest shown in FIG. 9 may correspond to 100×k.

In S406, the threshold value generating device 120 of the processor 100 may determine the critical range based on the confidences for the grayscales.

Figure 10:
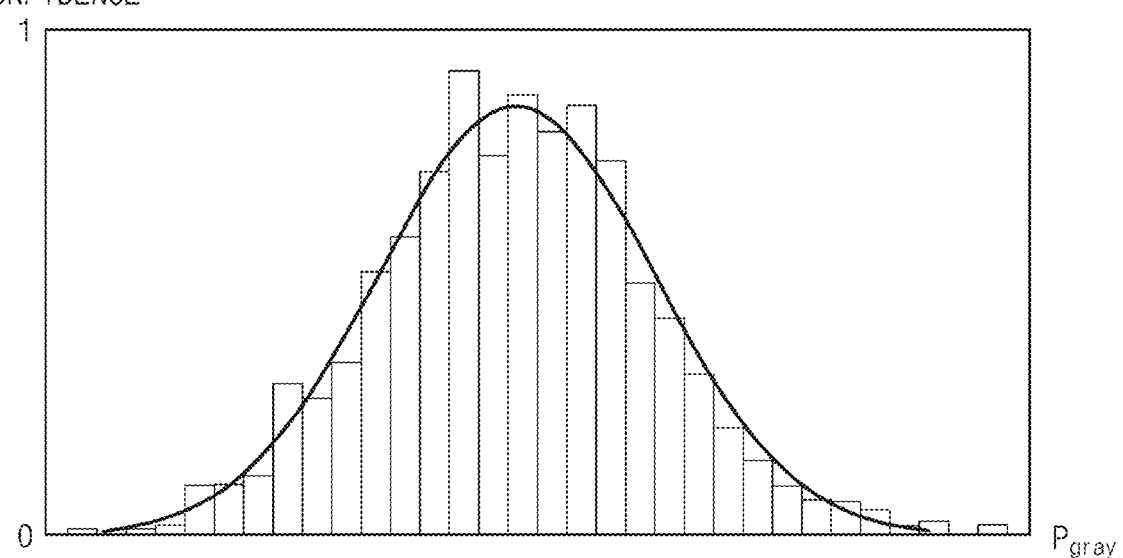
FIG. 10 is a view exemplarily illustrating a confidence distribution expressed as a histogram.

To determine the critical range, the threshold value generating device 120 may express the confidence distribution shown in FIG. 9 as a histogram as in FIG. 10.

In S407, the mask generating device 130 of the processor 100 may generate the mask based on the critical range.

The critical range may be a criterion for determining whether the arbitrary pixel belongs to the class of interest. For the mask generating device 130 to determine the critical range, it may be assumed that the histogram distribution shown in FIG. 10 follows a normal distribution.

Figure 11:
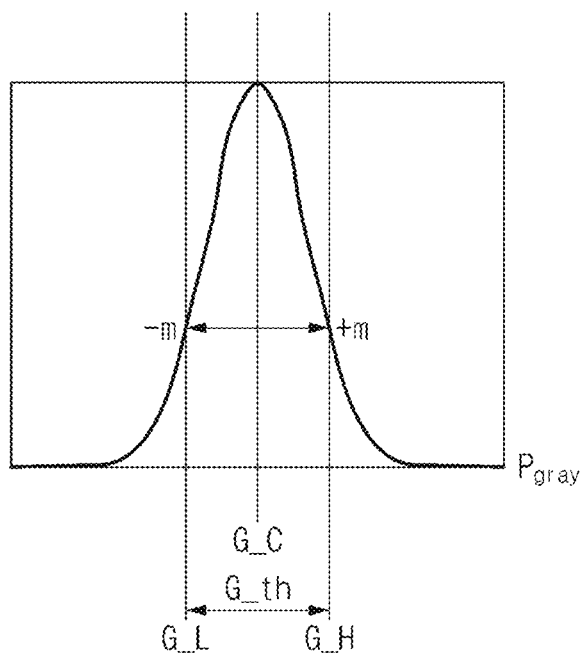
FIG. 11 is a view exemplarily illustrating a confidence distribution based on a grayscale value expressed as a normal distribution.

FIG. 11 is a view exemplarily illustrating a confidence distribution based on a grayscale value expressed as a normal distribution.

Referring to FIG. 11, a center value of the normal distribution may be an average value of the grayscale values. The mask generating device 130 may determine an upper limit boundary value G_H by adding a margin m to an average value G_C of the grayscale values, and determine a lower limit boundary value G_L by subtracting the margin m from the average value G_C of the grayscale values. The mask generating device 130 may determine grayscale values within a range from the lower limit boundary value G_L to the upper limit boundary value G_H as a critical range G_th.

The mask generating device 130 may generate the mask for detecting a pixel including the grayscale value that falls within the critical range.

Figure 12A:
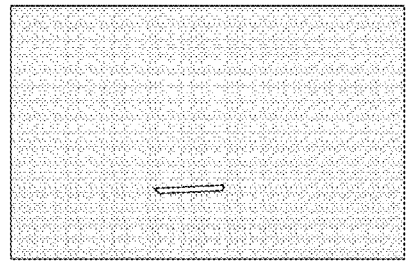
FIG. 12A is a view exemplarily illustrating a mask according to Comparative Example.
Figure 12B:
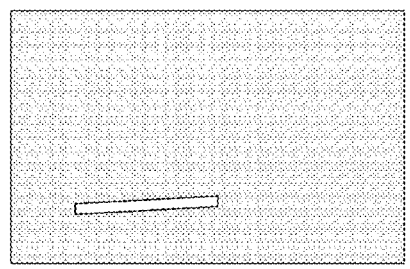
FIG. 12B is a view exemplarily illustrating a mask according to Example of the present disclosure.

FIG. 12A is a view exemplarily illustrating a mask according to Comparative Example, and FIG. 12B is a view exemplarily illustrating a mask according to Example of the present disclosure. FIG. 12A and FIG. 12B may be masks for detecting a class corresponding to a stop line in the image frame shown in FIG. 5.

Furthermore, in S408, the class detecting device 140 of the processor 100 may detect the class of interest based on the mask.

Figure 13A:
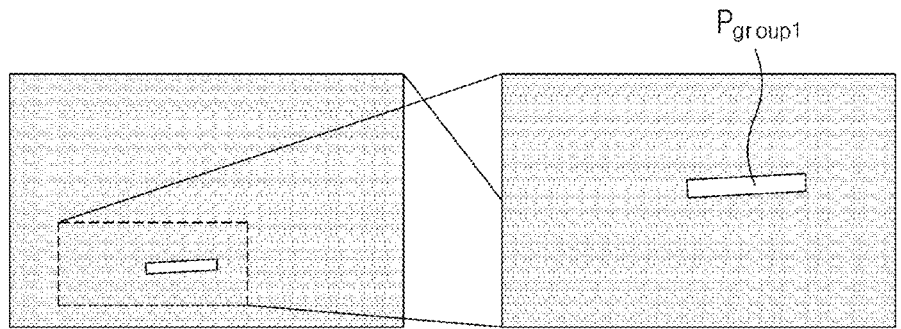
FIG. 13A is a view exemplarily illustrating a result of class detection performed based on a mask according to Comparative Example.
Figure 13B:
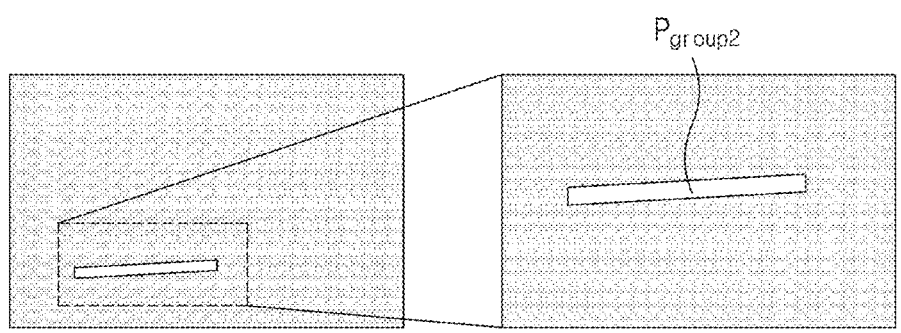
FIG. 13B is a view exemplarily illustrating a result of class detection performed based on a mask according to Example of the present disclosure.

FIG. 13A is a view exemplarily illustrating a result of class detection performed based on a mask according to Comparative Example, and FIG. 13B is a view exemplarily illustrating a result of class detection performed based on a mask according to Example of the present disclosure.

Figure 14A:
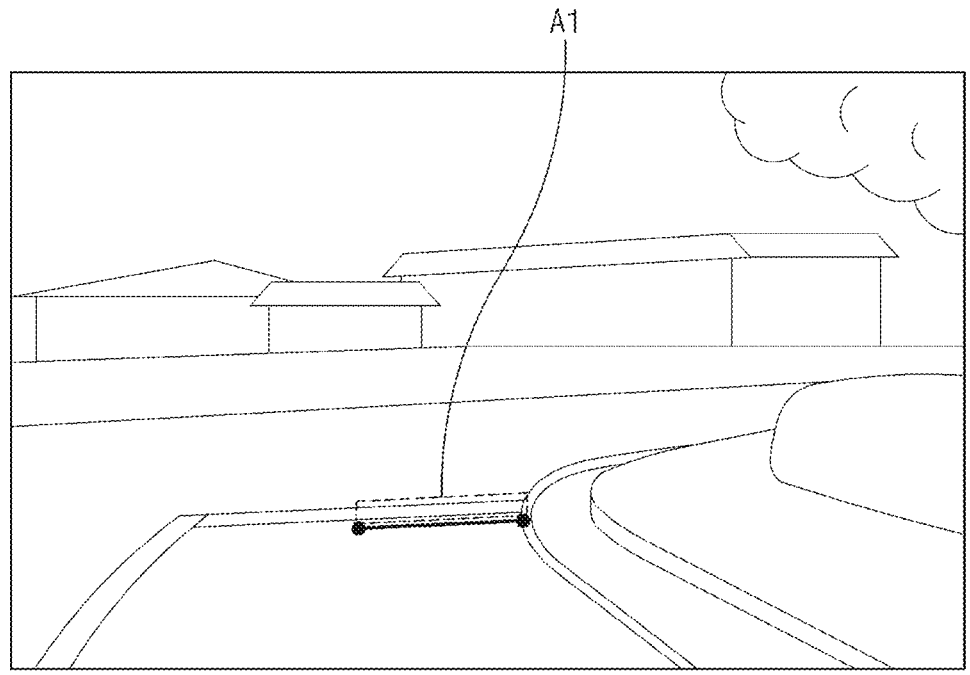
FIG. 14A is a view exemplarily illustrating a result of detecting a stop line in an image frame based on a mask according to Comparative Example.
Figure 14B:
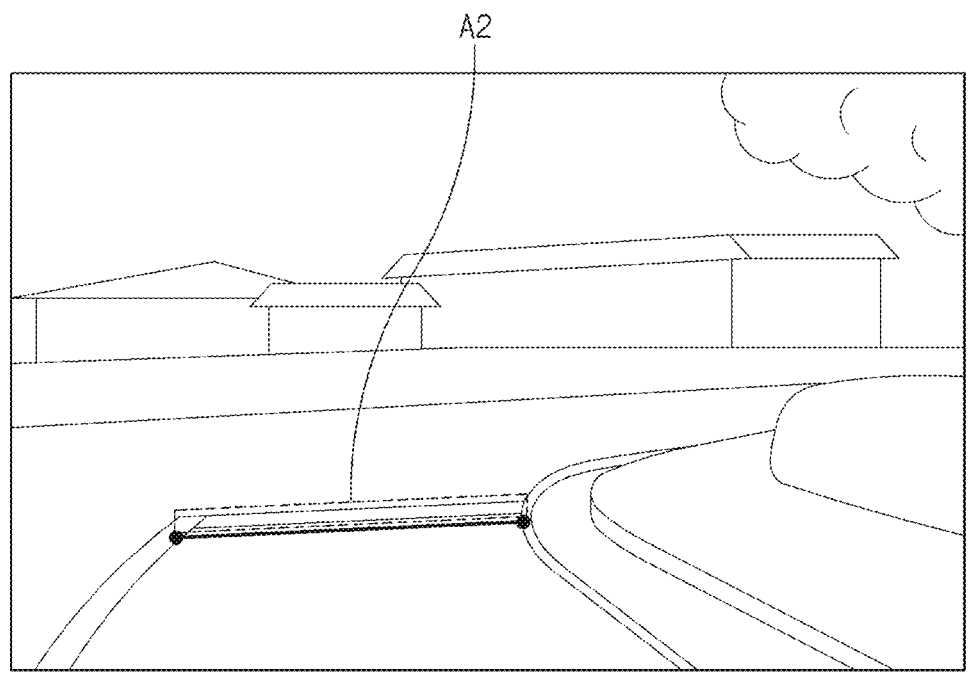
FIG. 14B is a view exemplarily illustrating a result of detecting a stop line based on a mask according to Example of the present disclosure.

FIG. 14A is a view exemplarily illustrating a result of detecting a stop line in an image frame based on a mask according to Comparative Example, and FIG. 14B is a view exemplarily illustrating a result of detecting a stop line based on a mask according to Example of the present disclosure.

As in FIG. 13A, the mask according to Comparative Example according to the related art may make an error of detecting only a first pixel group Pgroup1 corresponding to some pixels among all the pixels displaying the stop line as the class because of an error in the image learning process. As a result, according to Comparative Example, as shown in FIG. 14, only a partial region A1 of the stop line may be detected as the class.

In contrast, according to Example of the present disclosure, the mask generating device 130 may generate the critical range for the class detection based on the plurality of class similarities and the plurality of class confidences for each pixel. That is, according to Example of the present disclosure, the critical range for the class detection is generated in real time via the image learning and has more flexible characteristics. Accordingly, class detection errors may be reduced, and a second pixel group Pgroup2 which is not able to be detected using the mask according to Comparative Example may be detected as the class, as shown in FIG. 13B. Consequently, according to Example of the present disclosure, as shown in FIG. 14B, an entire regions A of the stop line may be detected as the class.

Figure 15:
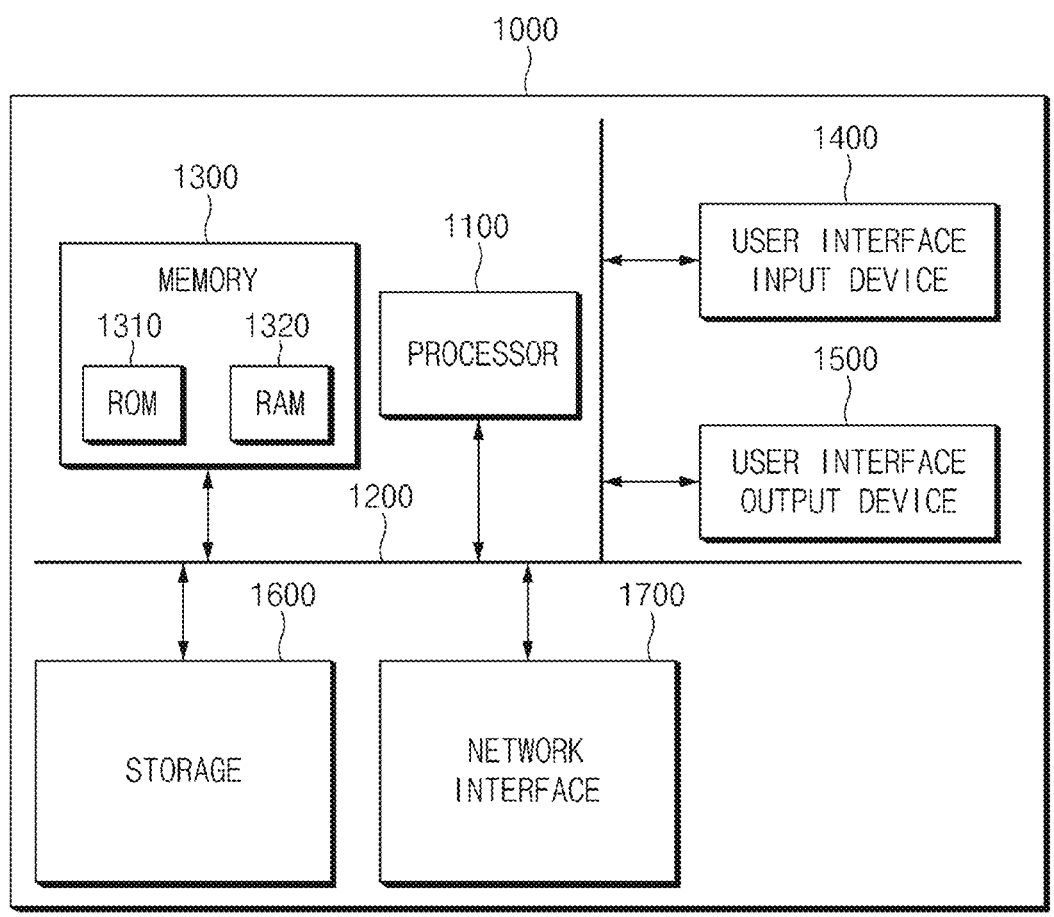
FIG. 15 is a view exemplarily illustrating a determining system according to an exemplary embodiment of the present disclosure.

FIG. 15 is a view exemplarily illustrating a computing system according to an exemplary embodiment of the present disclosure.

With reference to FIG. 15, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a Read-Only Memory (ROM) and a Random Access Memory (RAM).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary embodiments included in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to an exemplary embodiment of the present disclosure, because the objects are not classified using the threshold value of the fixed magnitude, the objects may be classified more flexibly in the image frame.

Furthermore, according to an exemplary embodiment of the present disclosure, because the critical range for the object classification is determined based on the image obtained in real time, the objects may be classified more accurately.

Furthermore, various effects directly or indirectly identified through the present specification may be provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for detecting an object, the apparatus comprising:
    a camera configured for obtaining an image frame for an external environment of a vehicle;
    a storage configured for storing a class classification model of the image frame; and
    a processor configured to:
    extract a class for distinguishing the object in the image frame;
    determine class confidences for each of pixels of the image frame;
    extract pixels of interest belonging to a class of interest;
    extract grayscale values of the pixels of interest in the image frame;
    match the confidences respectively to the grayscale values of the pixels of interest to generate a distribution of the confidences for the grayscales;
    generate a critical range for determining a grayscale of the class of interest based on the distribution of the confidences for the grayscales; and
    generate a mask based on the critical range.

2. The apparatus of claim 1, wherein the processor is configured to extract the class for distinguishing the object from the image frame using a segmentation model.

3. The apparatus of claim 1, wherein the processor is configured to, as part of determining the class confidences for each of the pixels of the image frame:
    determine a similarity between an arbitrary pixel and each of preset classes; and
    determine the class confidence of the arbitrary pixel with each of the preset classes based on the similarity.

4. The apparatus of claim 3, wherein the processor is configured to determine the class confidence in proportion to a magnitude of the similarity.

5. The apparatus of claim 3, wherein the processor is configured to determine the class confidence based on cumulatively learned similarity.

6. The apparatus of claim 1,
    wherein the processor is configured to, when the image frame includes n pixels expressing a single color, extract the pixels of interest from the n pixels, and
    wherein the n is a natural number.

7. The apparatus of claim 1, wherein the processor is configured to:
    when the image frame includes R, G, and B pixels,
    extract a first grayscale values based on luminance or intensity of the R pixel of interest in the image frame;
    obtain a distribution of confidences for grayscales for the R pixel of the class of interest based on the first grayscale values;
    extract a second grayscale values based on luminance or intensity of the G pixel of interest in the image frame;
    obtain a distribution of confidences for grayscales for the G pixel of the class of interest based on the second grayscale values;
    extract a third grayscale values based on luminance or intensity of the B pixel of interest in the image frame; and
    obtain a distribution of confidences for grayscales for the B pixel of the class of interest based on the third grayscale values.

8. The apparatus of claim 5, wherein the processor is configured to, as part of generating of the critical range:
    generate a normalized distribution based on the distribution of the confidences for the grayscales;
    determine a margin so that a preset sample ratio is included in the normalized distribution; and
    determine a range region from a value obtained by subtracting the margin from an average grayscale value of the normalized distribution to a value obtained by adding the margin to the average grayscale value as the critical range.

9. The apparatus of claim 8, wherein the processor is configured to generate the mask to extract a grayscale value belonging to the critical range as the class of interest.

10. A method for detecting an object, the method comprising:
    extracting, by a processor, a class for distinguishing the object in an image frame;
    determining, by the processor, class confidences for each of pixels of the image frame;
    extracting, by the processor, pixels of interest belonging to the class of interest;
    extracting, by the processor, grayscale values of the pixels of interest in the image frame;
    matching, by the processor, the confidences respectively to the grayscale values of the pixels of interest to generate a distribution of the confidences for the grayscales;
    generating, by the processor, a critical range for determining a grayscale of the class of interest based on the distribution of the confidences for the grayscales; and
    generating, by the processor, a mask based on the critical range.

11. The method of claim 10, wherein the extracting of the class for distinguishing the object from the image frame utilizes a segmentation model.

12. The method of claim 10, wherein the determining of the class confidences for each of the pixels of the image frame includes:
    determining a similarity between an arbitrary pixel and each of preset classes; and
    determining a confidence of the arbitrary pixel with each of the preset classes based on the similarity.

13. The method of claim 12, wherein the determining of the confidence of the arbitrary pixel with each of the classes includes:
    determining the confidence in proportion to a magnitude of the similarity.

14. The method of claim 12, wherein the determining of the confidence of the arbitrary pixel with each of the classes includes:
    determining the confidence based on cumulatively learned similarity.

15. The method of claim 10, wherein the extracting of the pixels of interest includes:
when the image frame includes n pixels expressing a single color,
selecting the pixels of interest from the n pixels, wherein the n is a natural number.

16. The method of claim 10, wherein the extracting of the pixels of interest includes:
when the image frame includes R, G, and B pixels,
extracting a first grayscale values based on luminance or intensity of the R pixel of interest in the image frame;
obtaining a distribution of confidences for grayscales for the R pixel of the class of interest based on the first grayscale values;
extracting a second grayscale values based on luminance or intensity of the G pixel of interest in the image frame;
obtaining a distribution of confidences for grayscales for the G pixel of the class of interest based on the second grayscale values;
extracting a third grayscale values based on luminance or intensity of the B pixel of interest in the image frame; and
obtaining a distribution of confidences for grayscales for the B pixel of the class of interest based on the third grayscale values.

17. The method of claim 14, wherein the generating of the critical range includes:
generating a normalized distribution based on the distribution of the confidences for the grayscales;
determining a margin so that a preset sample ratio is provided in the normalized distribution; and
determining a range region from a value obtained by subtracting the margin from an average grayscale value of the normalized distribution to a value obtained by adding the margin to the average grayscale value as the critical range.

18. The method of claim 17, wherein the generating of the mask includes:
generating the mask to extract a grayscale value belonging to the critical range as the class of interest.

\* \* \* \* \*